Dec. 12, 1939.    G. CHARLTON    2,183,254
VALVE STRUCTURE AND METHOD OF FORMING
Filed June 28, 1937    5 Sheets—Sheet 1

INVENTOR
George Charlton.
BY Harness, Dickey & Pierce.
ATTORNEYS.

Dec. 12, 1939.  G. CHARLTON  2,183,254

VALVE STRUCTURE AND METHOD OF FORMING

Filed June 28, 1937  5 Sheets-Sheet 2

INVENTOR
George Charlton.
BY Harness, Dickey & Pierce
ATTORNEYS.

Dec. 12, 1939.  G. CHARLTON  2,183,254

VALVE STRUCTURE AND METHOD OF FORMING

Filed June 28, 1937  5 Sheets-Sheet 4

INVENTOR
George Charlton.
BY Barness, Dickey & Pierce
ATTORNEYS.

Patented Dec. 12, 1939

2,183,254

UNITED STATES PATENT OFFICE 2,183,254

VALVE STRUCTURE AND METHOD OF FORMING

George Charlton, Battle Creek, Mich., assignor to Eaton Manufacturing Company, Cleveland, Ohio, a corporation of Ohio Application June 28, 1937, Serial No. 150,771

10 Claims. (Cl. 29—156.7)

This invention relates broadly to hollow bodies, either in the formative or final form, and is particularly applicable to valves of the poppet type and while in the broader sense it may be applicable to any type of poppet valve it is particularly applicable to poppet valves for use in connection with internal combustion engines.

Objects of the invention include the provision of a new and novel method of forming a hollow body; the provision of a new and novel method of providing a poppet valve with a special alloy seating surface; the provision of a novel method of making a poppet valve from a plurality of separately formed parts; the provision of a new and novel method of making hollow poppet valves; the provision of a new and novel method of making a valve from a plurality of separately formed parts and to provide it with a special alloy seating surface; and the provision of a method of making a special alloy seating surface in which the alloy is employed to integrally join two or more independently formed parts of the valve.

Further objects of the invention include the provision of a new and novel blank for a hollow body; the provision of a new and novel form of poppet valve blank; the provision of a new and novel form of poppet valve blank which when suitably machined will provide a poppet valve having a special alloy seating surface; and the provision of a poppet valve blank including a readily machinable mold forming portion which may or may not form a part of a completed valve.

The above being among the objects of the present invention the same consists in certain novel features of construction, combinations of parts, and step or steps of operation to be hereinafter described with reference to the accompanying drawings, and then claimed, having the above and other objects in view.

In the accompanying drawings which illustrate suitable embodiments of the present invention and in which like numerals refer to like parts throughout the several different views.

Fig. 37 is a fragmentary sectional view taken axially through the head portion of a still further modified form of valve blank;

As previously mentioned the present invention is applicable generally to hollow bodies and their manufacture whether these hollow bodies are in a formative or blank state, or are hollow as a finished product. Inasmuch as one of its chief and immediate applications is in connection with the formation of poppet valves for internal combustion engines the description will be primarily limited to this use. It will be understood, of course, that in the broader sense it is more or less immaterial as to the particular use or type of poppet valve to which the invention is applied but inasmuch as it is particularly adaptable for use in connection with poppet valves for internal combustion engines required to withstand hard use at elevated temperatures during operation, this type of valve will be employed mainly to illustrate various applications and embodiments of the invention.

In the broader aspects of the present invention a poppet valve having a main body portion of low carbon steel or any other suitable material may be provided with a seating surface of special or desirable metal intimately bonded thereto. This may be provided by surrounding that portion of the main body portion of the valve adapted to provide the seating surface with a housing, a suitable mass of the material from which it is desired to form the seating surface, preferably in granular or like form, being contained within the housing or the associated valve, the whole being subjected to a suitable heat whereby to cause the material which is to form the valve seating portion to melt and the whole then being subjected to centrifugal force whereby to distribute the material adapted to form the seating surface between the main body portion and the housing over that portion of the main body portion of the valve where the seating portion is desired, the effect of the centrifugal action being maintained until the seating material has solidified and the housing then being removed in any suitable manner such as machining to provide the completed valve. As will be obvious in accordance with this method it is necessary that materials from which the valve seating portion of the valve is to be formed must have a lower melting point than the melting point of the main body portion of the valve, this being a feature easily obtainable yet permitting the provision of a valve seating portion for the valve of either suitably hard or soft character, capable of standing relatively high temperatures, of required character to withstand the corrosive and/or erosive actions of the exhaust gases, or other desired characteristics.

In another sense, and in accordance with other broad principles of the present invention it may be employed for integrally uniting a plurality of parts to form an integral valve structure. In accordance with this phase of the invention the plurality of parts are so constructed and arranged as to provide a reservoir for the granular alloy material and the parts are so constructed and arranged that upon melting of the material and spinning of the assembly the alloying material will become intimately bonded to all of the parts and, after being subjected to centrifugal action and solidifying, will form all of the parts into a unitary valve structure. This last phase of the present invention is particularly valuable in connection with the forming of hollow valves and particularly hollow valves of the type adapted to enclose a suitable amount of metallic sodium or other suitable material which will melt when the valve is operating at elevated temperatures and will serve to carry heat away from the head portion thereof and dissipate it through parts in contact with the stem portion in accordance with known practices. In such case the main body portion of the valve may be made of suitable hollow structure having an open head permitting ease in the formation and machining of the interior of the head portion of the valve, together with a closure for the open head, the granular alloy material in such case being inserted in the space provided between the closure and the main body portion of the hollow head whereby after heating the assembly sufficient to melt the alloy and subjecting it to suitable centrifugal force a seal will be provided between the main body portion and the closure which will effectively prevent leakage or escape of the cooling medium from the interior of the valve during operation of the valve under high temperatures.

The two above described features may obviously be combined whereby a hollow valve may be formed from a plurality of parts and the various parts not only intimately bonded and sealed to one another but may be simultaneously provided with a seating surface of suitable character. This may be accomplished in the manner last described and so further forming the cooperating parts and/or providing a housing in association therewith whereby the melted alloy not only will serve as the bond between the parts but will be distributed about that portion of the outer face of the completed valve which is adapted to contact with the valve seat.

It may be noted at this point that it has heretofore been suggested that hollow valves intended to contain sodium or other cooling agent be formed by constructing the valve in two or more pieces each of which may be relatively easily machined and thereafter welding them together by known methods as for instance electric or gas welding but this practice has never become commercially practicable for the reason that it is commercially impracticable in production to produce this type of valve in this manner without an unduly large percentage of scrap and the final product, even where the weld appears perfect, too frequently develops cracks in the welded zone which permits escape of the cooling medium. Because of these reasons such types of valves as have heretofore been successfully used commercially and produced in commercial quantities have been produced from a single piece of steel by boring it out of a solid bar and swaging down the stem portion to suitable dimensions, which obviously requires an unusually large amount of extremely careful and expensive work in their production. By the employment of the present invention the most difficult parts of the valve structure may be easily, quickly and economically produced on screw machines and the bond produced between the various independently formed parts is of such a character as to definitely eliminate the production of any valves of this type which require scrapping because of the defects in the weld or weakness in the welded zone. The process obviously lends itself to great diversity in the design and arrangement of the plurality of parts which will eventually form a completed valve and, where a mold forming housing is employed in association with a valve forming blank, to a great diversity in the design and arrangement of such housing. The various modifications illustrated in the accompanying drawings are to be taken as indicative only of some of the various forms and arrangement of parts that may be employed in accordance with the present invention to obtain the desired ultimate result.

Figure 1:
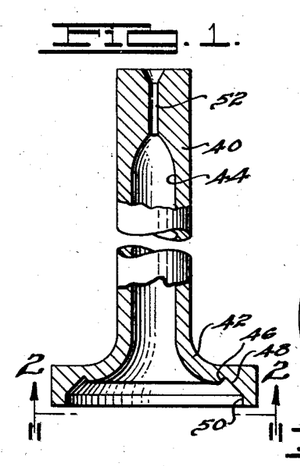
Figure 1 is a partially broken, partially sectioned view taken axially through the main blank body portion of a poppet valve structure formed in accordance with one phase of the present invention.
Figure 2:
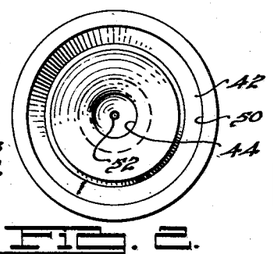
Fig. 2 is an end view of the blank portion shown in Fig. 1, taken on the line 2—2 thereof.

Referring now to Figs. 1 and 2 it will be noted that in accordance with the present invention a valve main body portion is provided comprising a stem portion 40 having an integrally formed head portion 42 thereon. This portion of the valve may be made from any suitable steel or steel alloy such as is commonly used for the valves for internal combustion engines. Where the valve is to be used as an exhaust valve this portion of the valve is preferably of a type of steel that will stand the high temperatures and corrosive action of the exhaust gases and in such case it may be desirable to employ an alloy generally known to the trade as silcrome X-142 having the following analysis:

|  | Per cent |
|---|---|
| Carbon | .40 to .50 |
| Manganese maximum | .70 |
| Chromium | 13.00 to 15.00 |
| Nickel | 13.00 to 15.00 |
| Silicon | .30 to .80 |
| Tungsten | 1.75 to 3.00 |
| Phosphorous maximum | .03 |
| Sulphur | .03 |
| Iron—remainder. | |

Inasmuch as it is considered that the valve shown in Figs. 1 to 9, inclusive, is to be of the hollow type filled with sodium or other suitable material for effecting cooling of the head portion thereof the stem portion 40 is shown as being provided with a bore 44 which bore flares outwardly in the head portion 42 and in which head portion the bore is machined to provide a pair of beveled faces 46 and 48, respectively, arranged in approximately right angular relation with respect to each other and both at an angle with respect to the axis of the valve. It may be noted, however, that in this particular modification the surface 48 is of approximately the same but preferably slightly larger in size than the seating face desired in the finished valve and is of the same general contour. The surface 48 terminates at its outer end in a cylindrical surface 50 which opens on to the corresponding end face of the valve part shown in Figs. 1 and 2. The upper end of the valve stem 40 is substantially closed except for a small opening 52 provided axially therein for the purpose of later permitting the introduction of a suitable quantity of sodium or other cooling agent into the interior of the valve structure, after which it will be understood that the opening 52 will be securely plugged and sealed against the escape of such material therethrough in a known manner.

The parts shown in Figs. 1 and 2 may be made from bar stock and suitably machined to shape as shown, it may be made from bar stock of substantially the diameter of the stem 40 and the enlarged end thereof provided by upsetting or the like, or it may be made from tubular stock and the upper end of the valve stem upset or otherwise acted upon to provide the substantially closed end portion and the opposite end swaged, pressed or otherwise suitably acted upon to expand it to the desired diameter for the head portion 42. In any event the hollow interior of this part of the valve will be open to ready machining over its entire interior surfaces thereby permitting the wall thickness of the finished valve to be definitely determined with the desired degree of accuracy.

Figure 3:
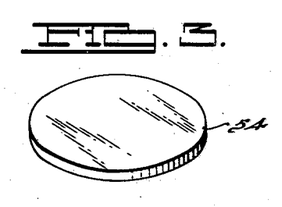
Fig. 3 is a perspective view of the closure disc for the blank portion shown in Figs. 1 and 2.
Figure 4:
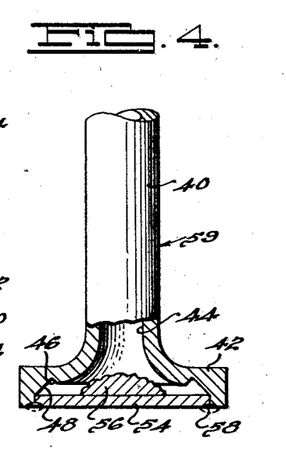
Fig. 4 is a fragmentary, partially broken, partially sectioned side elevational view of the parts shown in the preceding figures in assembled relation and enclosing a suitable mass of alloying material previous to being subjected to a heating operation.

The cylindrical portion 50 at the outer end of the bore in the parts shown in Figs. 1 and 2 is adapted to receive a closure member or part such as the disc 54 in perspective in Fig. 3, in the manner illustrated in Fig. 4. The disc 54 may be formed of the same material as the body of the valve, or of a different material if desired. As illustrated in Fig. 4 the disc 54 substantially fits the cylindrical portion 50 of the head 42 and is preferably of a thickness substantially equal to the axial length of the portion 50 so that when received therein with its inner edges abutting the surface 48 its outer face will be in substantially flush relationship with the outer head and face of the head portion 42 as illustrated in Fig. 4. Before inserting the disc 54 into the head portion 42 a quantity of suitable material 56 is placed in the bore 44, the disc 54 is inserted in place and then the joint between the disc 54 and the head 42 is secured and sealed as by welding as at 58. The weld 58 may be an electric, gas or other suitable weld and although it serves no purpose in the final product is must be of sufficient character to definitely seal the joint between the head 42 and the disc 54 against the escape of the material 56 when molten and subjected to the effect of centrifugal force which tend to eject it through the joint mentioned.

The material 56 will usually be of a composition which will be determined to a great extent by the use to which the valve is to be put. Where the valve is not required to withstand anything above normal temperatures, or relatively low temperatures, it may be hard solder, spelter, or the like. Where higher temperatures are to be encountered by the valve any suitable metal or alloy capable of being bonded to the head 42 and disc 54 in molten condition and of a character to withstand the temperatures to be encountered without melting or materially weakening its structure may be employed. Aluminum bronze is an example of a material that may be employed under such conditions. Where the valve is for an internal combustion engine and particularly where it is of the sodium or other cooled types as that indicated requiring it to withstand relatively high temperatures, and the body of the valve and the disc 54 are formed from a suitable steel, a suitable steel alloy having a melting point lower than that of the main body portion of the valve and of the disc 54 will usually be found preferable. Where as in the case illustrated in Figs. 1 to 9, inclusive, the material 56 in its final form is also to serve the purpose as the seating surface of the valve and for that reason is desired to be of a type of material that is relatively hard and resistant to wear as well as resistant to the corrosive and erosive effects of the high temperature exhaust gases an alloy of approximately the following composition has been found suitable.

| | Per cent |
|---|---|
| Carbon | 0.76 |
| Manganese | 0.14 |
| Chromium | 9.04 |
| Silicon | 0.63 |
| Nickel | 33.17 |
| Boron | 1.87 |

Balance—principally iron.

The melting point of this alloy is approximately 2075° F. With this alloy spinning can readily be done between 2150° F. and 2200° F. and it may be employed where the main body portion of the valve and the disc 54 are made of steels having ordinary melting points. Where employed in such a way as to form the valve seating surface it provides such surface having a hardness of approximately 35 Rockwell, C scale.

Another alloy suitable for use as the material 56 where the body 40—42 and disc 54 of the valve are formed from ordinary steel and where the valve seating surface is desired to be of extreme hardness as well as resistant to the corrosive and erosive effects of exhaust gases is as follows, the percentages given being more or less approximate.

| | Per cent |
|---|---|
| Carbon | 0.38 |
| Silicon | 0.23 |
| Chromium | 14.53 |
| Tungsten | 18.08 |
| Boron | 3.5 |

Balance—principally iron.

The melting point of this alloy is approximately 2130° F. and successful spinning has been done with it at 2250° F. This alloy when used for the seat of the valve provides a hardness of 63 Rockwell, C scale.

When it is desired to employ a valve seat that is resistant to the corrosive and erosive effects of exhaust gases but is still soft enough to permit practical machining, an alloy similar to the example first given for this purpose can be used which has a machinable hardness of approximately 35 Rockwell, C scale. It will be noted that the other suitable alloy last mentioned has an approximate hardness of 63 Rockwell, C scale. The hardness of 35 Rockwell in the one case and 63 Rockwell in the other represents a wide range of hardness, from a machinable hardness to a very hard unmachinable state. Between this hardness range suitable alloys with varying degrees of hardness, corrosion and erosion resistance to the effects of exhaust gases can be produced. The ability to produce such "steel" alloys which have the necessary lower melting points than the ordinary melting point of steel lies principally in the use of the element "boron". A high carbon and silicon content has an effect in lowering the melting point but a pronounced lowering is effected by the use of boron.

The amount of the material 56 which is placed in each valve may be calculated but will ordinarily be determined by experimentation for each size and type of valve in which it is used. When assembled as indicated in Fig. 4 it is placed in the furnace preferably with its head down and subjected to a suitable temperature whereby to effect melting of the material 56. The temperature to which the assembly shown in Fig. 4 is subjected in the furnace is preferably in the neighborhood of 100° in excess of the melting point of the material 56 so as to insure complete fluidity of the material 56 in the furnace, as well as in the subsequent spinning operation.

The type of furnace in which the assembly shown in Fig. 4 is inserted for the purpose of bringing its temperature to a sufficiently high value to insure melting of the material 56 is more or less immaterial. In other words it may be oil or gas fire or any suitable type of electric furnace, the furnace indicated generally at 60 in Fig. 5 being shown as of a gas fire type by way of illustration only. While in the broader aspects of the present invention the valve assembly illustrated in Fig. 4 may be simply inserted in the furnace and brought to the required temperature, it is preferably to so support and act upon the assembly while in the furnace as to cause the material 56 when in molten condition to wash the interior walls thereof particularly adjacent the joint between the head 42 and disc 54 in order to insure a more perfect bond with such wall. In such case the method and apparatus illustrated in Fig. 5 may be resorted to.

Figure 5:
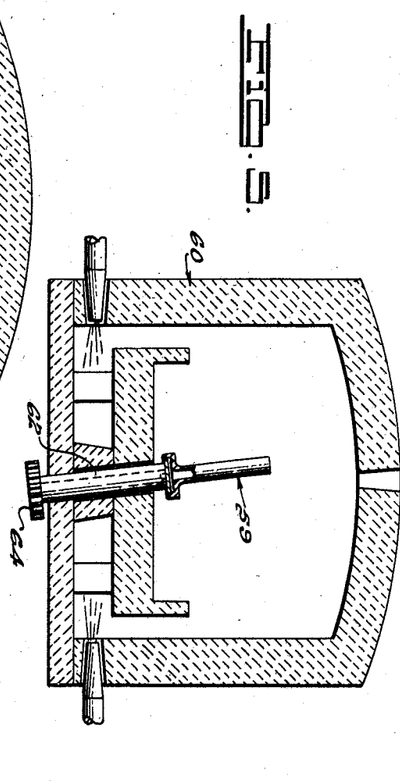
Fig. 5 is a verticaal transverse sectional view taken through a suitable furnace showing the blank assembly illustrated in Fig. 4 suitably mounted therein.

As illustrated in Fig. 5 a rotatable spindle 62 is illustrated as projecting upwardly through the bottom of the furnace into the interior thereof and is suitably formed at its upper end for reception and releasable retention of an assembly such as shown in Fig. 4. Preferably the spindle 62 is slightly inclined from the vertical as indicated and its lower end is provided with a suitable gear wheel or the like 64 which will permit its rotation and consequent rotation of the valve assembly indicated in Fig. 4 and indicated as being supported thereby in Fig. 5. The spindle 62 and consequently the valve assembly being supported at an angle to the vertical in the furnace 60, as soon as the material 56 therein melts it will run under the influence of gravity to the lower portion of the hollow interior of the assembly and if under such condition the spindle 62 and valve assembly is rotated at a relatively slow rate the molten material 56 in tending to remain at the lower portion of the hollow interior of the assembly will have a continuous washing effect upon the surfaces with which it contacts, and this washing action will have the effect of dislodging any foreign material which might be sticking to such surfaces and also wets such surfaces and will cause the molten material 56 to be firmly bonded to such surfaces when it is finally spun rapidly in the spinning machine. This same general effect may be also obtained by the structure illustrated in Fig. 6 in which the furnace 60' may be considered identical to the furnace 60 illustrated in Fig. 5. In this case, however, instead of employing a spindle projecting upwardly through the bottom of the furnace, a spindle 66 is projected in a horizontal direction through a side of the furnace and is of a hollow nature so as to enable it to receive the stem portion 40 of a valve assembly as shown in Fig. 4 therein. With this structure, precautions are preferably although not necessarily taken to bring all of the material 56 into the head portion of the assembly prior to inserting it in the spindle 66, and the spindle 66 is rotated slowly in the same general manner as described in connection with Fig. 5, the effect, of course, being substantially identical.

Figures 7, 8, 9, 10, 11, 12, 13, 14, 15:
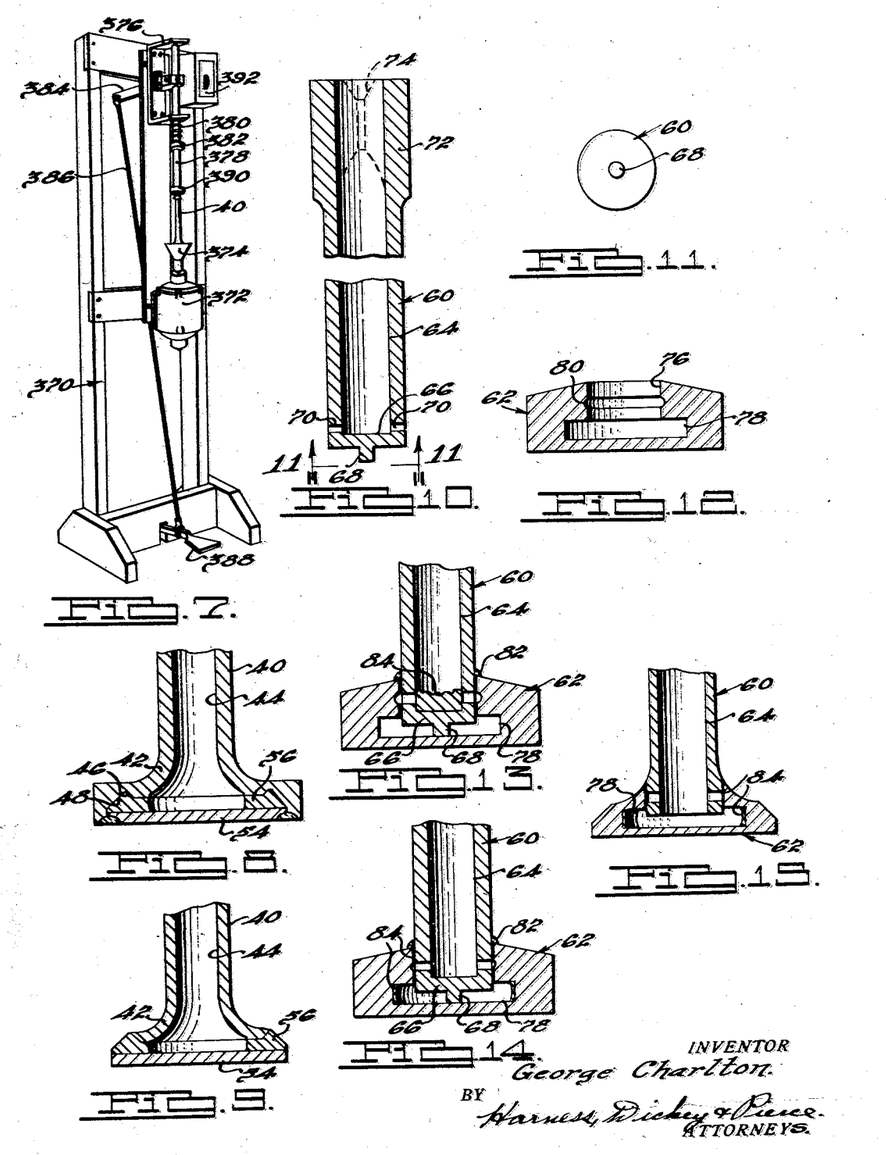
Fig. 7 is a perspective view of a suitable type of apparatus for spinning a valve blank assembly of the type shown in Fig. 4 after it has been suitably heated in a furnace such as shown in Figs. 5 or 6, in order to cause a centrifugal distribution of the melted alloy contained therein.
Fig. 8 is a fragmentary sectional view taken axially through the valve blank assembly shown in Fig. 4 after having been treated in the furnace such as shown in Figs. 5 and 6 and subjected to a spinning operation in an apparatus such as shown in Fig. 7.
Fig. 9 is a view similar to Fig. 8 but illustrating the completed valve.
Fig. 10 is a fragmentary sectional view taken axiallly through the stem portion of a modified form of poppet valve blank.
Fig. 11 is an end view of the part shown in Fig. 10, taken as on the line 11—11 thereof.
Fig. 12 is a sectional view taken axially through the head portion of a valve blank adapted for cooperation with the stem portion shown in Figs. 10 and 11.
Fig. 13 is a fragmentary sectional view taken axially through the parts shown in Figs. 10, 11 and 12 when in assembled position prior to the heating and spinning operation.
Fig. 14 is a view similar to Fig. 13 but showing the parts after they have been heated and spun.
Fig. 15 is a view similar to Fig. 14 but showing the completed valve machined from the blank shown in Fig. 14.

After the valve assembly 59 has been brought up to a suitably high temperature to effect melting of the material 56 and preferably after it has been subjected to the slow rotational movement in the furnace previously described to effect a washing of the melted material against the inner surfaces of the assembly 59 to effect a good bond therewith, it is removed from the furnace and immediately subjected while the material 56 is still in a molten condition to a spinning action at high speed about its axis so as to throw the material 56 to the outer edges of the space within the head portion of the assembly in the manner illustrated in Fig. 8 and to maintain it in such position until it has solidified.

One form of apparatus suitable for effecting this spinning operation is illustrated in Fig. 7 as comprising a frame work indicated generally at 370 positioned in an upright relation with respect to a floor upon which it is supported. This frame work carries an electric motor 372 arranged with its axis in a vertical relation and the upwardly projecting end of its driving shaft is provided with a hollow cone 374 the interior dimensions of which are sufficient to permit the reception of the head portion of the valve assembly therein. Suitably supported above and in axial alignment with the motor 372 by means of a bracket 376 secured to the upper cross-bar of the frame 370 is an axially shiftable shaft 378 constantly urged in a downward direction by means of a coiled spring 380 surrounding it below the bracket 376 and constantly maintained under compression between the lower flange of the bracket 376 and a collar 382 suitably fixed to the shaft 378. A lever 384 suitably pivoted in the bracket 376 for movement in a vertical plane is so constructed and arranged that its forward end is fixed against relative axial movement with respect to the shaft 378. The rear end of the lever 384 is connected by means of a rod 386 to a foot treadle 388 conveniently positioned for operation by the operator of the device. The lower end of the shaft 378 is provided with a rotatable head 390 the lower face of which is formed for reception of the upper end of the stem of the valve assembly. A switch mechanism 392 is provided for controlling the operation of the motor 372.

Figure 6:
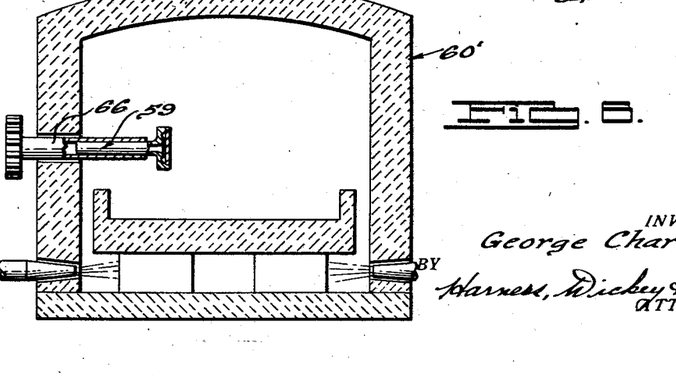
Fig. 6 is a view similar to Fig. 5 but illustrating a modified manner of supporting the valve blank assembly in a furnace.

With the apparatus thus described a valve assembly such as is shown in Fig. 4 which has been brought up to a suitable temperature as described in a furnace such as illustrated in Figs. 5 or 6 is removed from the furnace and immediately taken to the apparatus shown in Fig. 7, whereupon the operator presses downwardly on the treadle 388 which thus causes the shaft 378 to rise a sufficient distance to permit the head of the valve assembly to be inserted in the hollow cone 374 whereupon the treadle 388 is released while the upper end of the stem 40 of the assembly is positioned to be received by the head 390 on the shaft 378. The motor 372 is immediately revolved at a speed sufficient to effect the proper centrifugal distribution of the molten material 56 within the assembly and the assembly is maintained at this speed until sufficient time has elapsed to insure the material 56 having been solidified. Means such as a stream of air directed at the assembly may be employed to hasten the cooling thereof while in the spinning apparatus if desired. The speed at which the motor 372 and consequently the valve assembly is rotated is preferably much greater than that required for simply centrifugally distributing the molten material 56 in the assembly and in valves of ordinary size a speed of 3600 R. P. M. has been found satisfactory. The reason for using this excess speed is to insure that the molten material 56 will be packed under pressure against the cooperating surfaces within the hollow head portion of the valve, thereby to insure the formation of a more perfect bond and to densify the material 56.

As previously mentioned after the spinning operation is completed and the valve removed the material 56 will have assumed the condition illustrated in Fig. 8 in which the peripheral portion of the enlarged hollow interior of the assembly will be filled by the material 56 which is now intimately bonded to the surfaces of such portion both in the head portion 42 and in the disc 54. It will also be found that the interior surfaces of this portion of the valve will be smooth and of uniform shape and dimensions preventing subsequent occurrence of localized hot spots due to uneven absorption of heat therethrough. It will also be found that the resulting weld between the head portion 42 and the disc 54 will whenever ordinary precautions are taken in the manufacture, cleaning and assembly of the parts, be perfect and of such character as to resist rupture or leakage of the joint between them under the severest of operating conditions.

After the assembly has reached the condition illustrated in Fig. 8 it may then be machined to bring it to the condition illustrated in Fig. 9 in which it will be observed that those portions of the head 42 positioned radially outwardly of the material 56 has been machined away to expose the material 56 which thus serves to provide the seat or seating surface of the valve, this procedure being followed where the material 56 is of a character more desirable for the valve seating portion than the material from which the main body portion of the valve is formed. Where the material 56 does not have such desirable characteristics, then it will be apparent that under such conditions the head portion 42 will not be machined away to the extent illustrated in Fig. 9 but may itself be machined to provide the desired valve seating surface. If the valve is to be of the sodium filled type or filled with other suitable material such, for instance, as disclosed in U. S. Patent No. 1,670,965, to enhance the cooling properties of the valve, such material may then be introduced into the interior of the valve through the opening 52 previously described, and such opening be suitably closed and sealed in accordance with known methods after which the valve may be further acted upon to bring it to its final condition of finish when and if required.

It will be understood that a valve manufactured in accordance with the above disclosure is relatively economical to produce comparison to previous practices employed in connection with the production of an equivalent valve of equivalent desirable characteristics, that a valve formed in accordance with the present invention provides the additional advantage of enabling a valve seating surface of special alloy to be simultaneously produced, and that the final product when of the internally cooled type is equally efficient to all intents and purposes as similar types of valves produced from a single piece of material in accordance with previous practices. The valve as an article is not claimed in the present application but forms the subject-matter of my co-pending application for Letters Patent of the United States for Improvements in valves, filed December 20, 1937, and serially numbered 180,761.

In Figs. 10 to 15, inclusive, the application of the present invention to the manufacture of a modified form of valve structure is illustrated. In this case the use of the special alloy is not shown as extended to the provision of a valve seating surface, although it may obviously be modified to do so, but as shown is simply employed to permanently secure two separately formed parts of the valve in their desired relation. The valve itself is shown as being of the hollow type, preferably for the purpose of enabling an internal coolant to be employed in connection therewith.

As illustrated in Figs. 10 to 15, inclusive, the valve in this case comprises a stem portion 60 and a separately formed head portion 62. The stem portion 60 is provided with a bore 64 that extends throughout the length thereof to adjacent its lower end which is provided with a transverse wall 66 exteriorly terminating centrally of the stem 60 in a small cylindrical projection 68. Openings 70 extend through the side walls of the stem 60 immediately above the wall 66 for a purpose which will hereinafter be more fully described. If the valve is to be of a type containing sodium or other cooling material adapted to be hermetically sealed within the valve, then the upper end of the stem 60 may be enlarged as at 72 to provide sufficient stock whereby such end of the valve may subsequently be swaged or otherwise worked down to the same diameter as the main body portion of the stem 60 to a practically closed condition such as indicated by the dotted lines 74 similar to the upper end of the valve stem shown in Fig. 1.

The valve head 62 is of approximately cylindrical conformation and provided with an axial bore 76 of a diameter to relatively closely receive the lower end of the stem 60 therein. The lower end of the bore 76 within the head 62 is enlarged as at 78 to provide a hollow space of the desired size, shape and contour desired in the finished valve head. The length of the projection 68 on the stem 60 is preferably equal to or slightly less than the depth of the enlarged portion 78 of the bore 76 so that when the stem 72 is assembled into the head 62 the projection 68 in bearing against the bottom wall of the enlargement 78 will act to space the lower end of the stem 60 from such lower wall in the manner illustrated in Fig. 13. The bore 76 intermediate its ends is formed to provide an annular groove 80 therein, this groove 80 being so arranged as to be in alignment with the openings 70 in the stem 60 when the parts are assembled as indicated in Fig. 13. If desired the head 62 and stem 60 may be sealed to each other as by being welded together as at 82 in Fig. 13 to prevent possible escape of the molten alloy therefrom during the spinning operation, although where the fit between the stem and the head is sufficiently close this welding operation may be dispensed with.

With this construction a mass of material 84, corresponding to the material 56 in the first described construction is introduced into the bottom portion of the hollow stem 60, the assembled stem and head are placed in a furnace which brings the entire assembly up to a temperature sufficiently high to melt the material 84, and then the assembly is spun in a fixture such as that shown in Fig. 7, the alloy 84 in this case being thrown radially outwardly from the interior of the stem through the openings 70 into the groove 80 in the head 62 and completely filling the space between the stem and the head in such a manner as to effect a permanent seal and weld between the two. The slow rotation of the assembly to get a washing action of the molten alloy thereon is not required in this construction. A certain amount of the molten alloy 84 will, during the spinning operation, escape down into the enlarged hollow portion 78 where the centrifugal force will throw it to the outer walls thereof as indicated in Fig. 14, but this is more a matter of necessity rather than intention unless it is desired to later machine the head portion down to expose this part of the alloy for seating surface purposes. When the material 84 has cooled in the spinning fixture it will be understood that the head and stem will be permanently secured together by a joint of such character that will effect a complete and permanent seal between them as indicated in Fig. 14. After the assembly has cooled a drill having an external diameter substantially equal to the internal diameter of the bore 64 in the stem 60 may be projected down through the stem 60, and the end wall 66 and the projection 68 carried thereby drilled out so as to provide completely open communication between the enlarged space 78 and the bore of the stem. This may be followed by a reaming operation if desired. Where it is desired to close the upper end of the stem 60 as indicated by the dotted lines 74, such end may be worked upon to effect this result and then the exterior of the valve may then be machined to bring it to a finished condition as indicated in Fig. 15. As will be apparent by this method a hollow headed valve may be produced in which the wall thicknesses of the hollow head as well as of the stem portion of the valve may be accurately determined in manufacture. At the same time it provides a method by means of which a valve of this type may be quickly and economically produced. The valve shown in Figs. 10 to 15, inclusive, and the method of producing the same constitutes the subject of my application for Letters Patent of the United States for Improvements in poppet valve and method of making same, filed February 12, 1938, Serial No. 190,220, the same constituting a division of the present application.

Figures 16, 17, 18, 19, 20, 21, 22, 23, 24, 25, 26, 27:
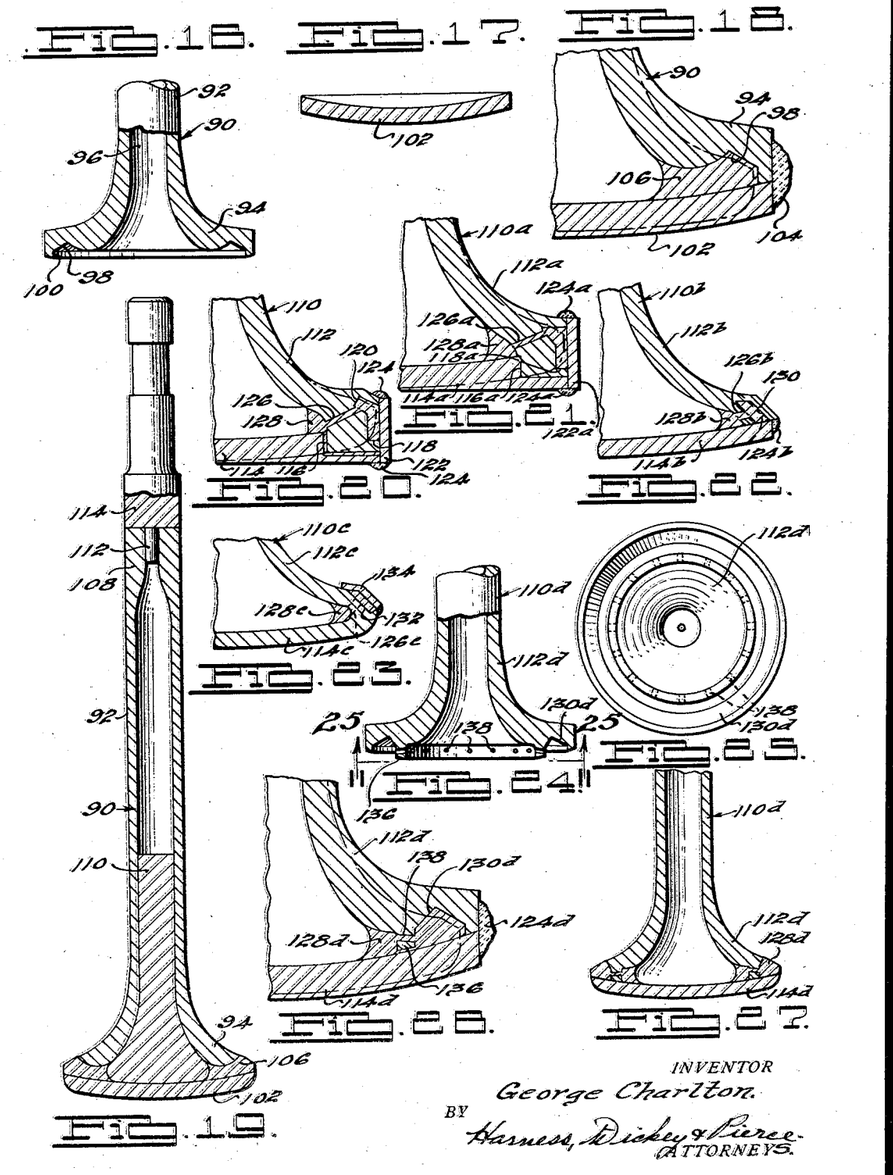
Fig. 16 is a fragmentary, partially broken, partially sectioned view taken axially through the head portion of a modified form of a valve main body portion.
Fig. 17 is a sectional view taken axially through a closure plate for the body portion shown in Fig. 16.
Fig. 18 is an enlarged fragmentary, sectional view taken axially through the parts shown in Figs. 16 and 17 after they have been assembled together with an alloying element contained between them, heated as indicated in Figs. 5 or 6 and spun with an apparatus such as disclosed in Fig. 7.
Fig. 19 is a partially broken sectional view taken axially of a valve formed in accordance with the disclosures in Figs. 16, 17 and 18 and completely machined therefrom, together with an enclosed amount of metallic sodium or other suitable contained medium adapted to melt upon being heated to effect a cooling of the valve in a known manner.
Figs. 20, 21, 22 and 23 are views similar to Fig. 18 but illustrating modified forms of construction.
Fig. 24 is a view similar to Fig. 16 but illustrating a modified form of construction.
Fig. 25 is an end view of the construction shown in Fig. 24 taken as on the line 25—25 thereof.
Fig. 26 is a view similar to Fig. 18 but of the valve parts shown in Figs. 24 and 25.
Fig. 27 is a fragmentary sectional view taken axially through a completed valve constructed in accordance with the disclosure of Figs. 24, 25 and 26.

In Figs. 16 to 19, inclusive, a construction and method is shown which is more similar to that described in connection with Figs. 1 to 4, inclusive. In this case a main valve body part illustrated generally at 99 and comprising a stem portion 92 and head portion 94 is provided with a bore 96 which is flared outwardly in the head portion 94 to provide a beveled surface 98 in conformance with the size, shape and contour of the desired valve seating surface in the final product and this is bounded at its outer end with a short cylindrical surface 100. The closure member 102 indicated in Fig. 17 is in this case preferably slightly dished as shown and of the same outside diameter as the outer diameter of the head portion 94 instead of being of a size to permit its fitting into the recess of the head as in the construction shown in Figs. 1 to 4, inclusive. In this case the closure member 102 is placed against the lower face of the head portion 94 as indicated in Fig. 18 and welded in such position as at 104. A suitable mass of alloying material is inserted in the valve in accordance with the practice described in connection with the description of Figs. 1 to 4, inclusive, the entire assembly is heated, preferably slowly rotated as indicated in either Figs. 5 or 6 to effect a washing of the molten alloy against the inner surfaces of the valve, and is then spun and cooled in an apparatus of the type shown in Fig. 7, thus throwing the molten alloy to the exterior of the hollow interior of the assembly where it assumes the shape indicated at 106 in Fig. 18 when cooled. If the valve is to be of the sodium or other internally cooled type the upper end of the stem 92 is provided with a thickened wall portion 108 provided with a small central aperture through which sodium 110 or other desired coolent is introduced and such aperture after being suitably reamed is then closed by a taper pin 112 after which an end portion 114 is welded onto the end of the stem to hold the pin 112 in position and to complete the seal of the valve interior at this point, this last procedure being in accordance with conventional practice. The entire valve may then be machined to bring it to the condition illustrated in Fig. 19 in which it will be observed that the material 106 not only serves to connect the main body portion 90 of the valve with the closure 102 and to seal the joint between them but also to provide a seating surface for the valve and which seating surface may be of the character previously described in connection with the valves shown in Figs. 1 to 4, inclusive.

In Figs. 20 to 27, inclusive, modified forms of construction are shown in all of which the special alloy which is placed in solid form within the valve assembly is melted by bringing the entire assembly to a suitably high temperature and then spinning it to cause the melted alloy to be centrifugally positioned in the location desired for the valve seating surface in accordance with the same general methods of operation as disclosed in connection with the construction shown in Figs. 1 to 9, inclusive, and all of which except the modification shown in Fig. 23 employ this alloy to secure independently formed parts of the valve together in permanently secured relation. The construction shown in these figures with the exception of the modification in Fig. 23 which is not formed of separately formed parts are further such as to impart a greater degree of strength to the outer edge of the valve head than in the construction shown in Figs. 1 to 9, inclusive, to thereby serve as a further precaution in preventing the appearance of cracks in this portion of the valve in service. It will also be understood that in the modification shown in Figs. 20 to 27, inclusive, the valves will be provided with stems which may be the equivalent of those shown in the preceding views and that the interior of the completed valve may be partially filled with metallic sodium or other suitable coolent as described in connection with previously described constructions if such is desired.

Referring now to Fig. 20 the hollow main body portion of the valve is indicated generally at 110 and as having an outwardly flared hollow head portion 112 the open end of which is adapted to be closed by a separately formed closure member 114. In this particular modification the peripheral inner marginal edge of the closure member 114 is cut away so as to provide a circular shoulder 116 thereon which is adapted to be received within the open end of the head 112 thereby to locate it centrally of the head as well as to provide a more perfect seal at this location. The peripheral edge of the head 112 is initially of cylindrical formation and is machined out to provide an annular pocket 118 having an upwardly and inwardly directed offset portion 120 the outer face of which approximately corresponds to the size, shape and contour of the valve seating surface desired in the final product. A ring 122 overlies the peripheral surfaces of the head 112 and the closure 114 and is welded or otherwise sealed thereto as at 124, thus cooperating with the pocket 118 to form an annular chamfer. A plurality of holes 126 are drilled between the offset portion 120 of the pocket 118 and the interior of the head 112 above the closure 114. Preferably the closure 114 is so assembled with respect to the head 112 and its dimensions are such in respect thereto that a slight clearance is left between the opposed faces of these parts as indicated in Fig. 20. With this construction when the solid alloy is placed in the valve assembly, the valve assembly heated and then spun in accordance with the previously described practice the alloy will assume the shape indicated at 128, that is it will completely fill the annular pocket 118 and its offset portion 120, the holes 126, and the space between the closure 114 and head 112, any excess remaining after these areas are filled being deposited at the peripherally outer edges of the space within the valve head. With this construction after the valve has cooled it may be machined to bring it to the shape indicated by the dotted lines which is that desired in the final product and in which the alloy 128 is exposed to provide the valve seating surface for the completed valve.

In Fig. 21 a construction is shown which is very similar to that shown in Fig. 20 and, accordingly, like parts are indicated by like numerals except that the numerals bear the sub-letter "a". The only difference between the construction shown in Fig. 21 as compared to that shown in Fig. 20 is that the shoulder 116a on the closure 114a is of a size to be relatively closely received within the open end of the head 112a, and the pocket 118a instead of being provided with an offset portion such as the portion 120 in Fig. 20 is merely deepened at the upper end thereof as indicated. Otherwise the construction is identical and the same general advantages will result.

In Fig. 22 the head portion 112b, instead of having an annular recess cut in its outer peripheral face, is provided with an angularly extending annular recess 130 in its end face and the closure 114b in this case is extended directly over the end face of the head 112b and over the open face of the recess 130 which it thus serves to close, it being welded thereto as at 124b. Openings 126b communicate the recess 130 with the hollow interior of the head 112b so that the alloy 128b when in molten condition will be thrown out through the openings 126 into the recess 130 when the valve is spun and thus placed in the position where in the subsequent machining operation the alloy 128b will be exposed to provide a valve seating surface as well as serve to permanently secure the closure member 114b to the head 112b.

In Fig. 23 an application of the present invention to a hollow valve constructed from a single piece of metal is illustrated. In this case it will be understood that the head portion 112c and end wall 114c are originally formed integrally with each other. The inner peripheral edge of the periphery of the valve head is cut away as at 132 over that area thereof at which the valve seating surface is to be formed and an annular ring-like member 134 overlies the portion 132 in generally spaced relation thereto and is welded to the valve along its opposite edges. Holes 126c communicate the hollow interior of the valve head with the pocket formed below the ring 134 so that when the alloy placed within the hollow valve is melted and the valve is spun it will be thrown through the periphery of the interior of the hollow valve head and be carried out through the openings to fill such pocket as indicated. In completing the valve the ring-like member 134 is machined away to expose the material 128c therebelow and which is positioned in proper relation to the valve to provide the seating surface thereof.

The construction shown in Figs. 24, 25, 26 and 27 is somewhat similar to that shown in Fig. 22 in that the end face of the head portion 112d is machined out as at 130d to provide an axially directed annular channel which is overlain with the closure member 114d and securely welded thereto as at 124d to provide an annular chamber for reception of the special alloy from which it is desired to form the valve seating surface. In machining out the channel 130d an annular flange or rib 136 is provided between the main hollow interior portion of the valve head 112d and the channel 130d. This rib 136 may be extended into contacting relation with respect to the inner surface of the closure 114d, in which case it will be desirable to provide a plurality of holes 138 therethrough to permit molten metal from the interior of the hollow valve head to flow therethrough into the channel 130d during the spinning operation, or it may be constructed so as to stop short of the interior surface of the closure member 114d in which case molten metal 128d may flow between its lower edge and the closure 114d to pass into the channel 130d, or it may be constructed to include both features as shown. After the parts shown have been welded together, heated and spun and brought to the condition illustrated in Fig. 26 the valve is then machined to bring it to the condition indicated in Fig. 27 in which condition the alloy 128d is exposed to provide a seating surface for the valve.

Figure 28:
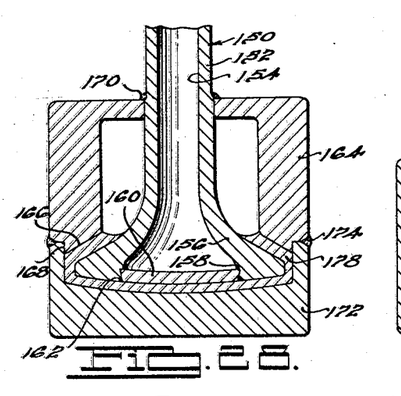
Fig. 28 is a fragmentary view taken axially through a modified form of poppet valve blank.

In Fig. 28 a different method of applying a special alloy seat or seating surface to a valve is illustrated and in which the special alloy is extended as a covering over the entire outer head portion of the valve. It may be employed in connection with a valve that is initially formed in one piece, either solid or hollow, and may also be applied to a hollow valve made up of a plurality of independently formed parts in which case it also serves to secure and seal such parts together into an integral final structure. This last type of construction is shown by way of illustration and it will be readily understood that where the valve is initially formed of a single piece, either hollow or solid, the same general method may be followed to provide a covering of the special alloy for the outer portion of the head of the valve but in such case the alloy will not be employed for welding two independently formed parts together and sealing the joint between them against leakage.

Referring now to Fig. 28 a construction is shown in which the valve includes a main body portion indicated generally at 150 and as including a stem 152 provided with a bore 154 and an enlarged hollow head portion 156 in which the bore is also enlarged. Adjacent its open end the head 156 is provided with a radially disposed shoulder 158 interiorly thereof which serves as a seat for a disc-like closure member 160 for such open end. The closure member 160 is the type that is generally known to the trade as a Welch plug, that is in its initial form it is relatively deeply dished and of an external diameter to permit it to be freely received in the open end of the valve and positioned in contact with the shoulder 158, after which it is subjected to suitable blows or otherwise acted upon to reduce the dished effect thereof thereby effecting an increase in its external diameter which causes it to be expanded and firmly locked into the open end of the valve due to its expansion. It may be desirable to slightly outwardly bevel the wall of the bore in the head 156 outwardly of the shoulder 158 as indicated in order to effect a more secure locking together of the head 156 and closure 160. If desired after the closure 160 has been positioned as indicated it may be further locked and sealed to the head 156 as by welding as at 162.

In order to apply the special alloy seating surface which in this case also forms an enclosure for the outermost portion of the head of the valve, an inverted cup-like member 164 having a concentric opening through its bottom wall of a sufficient size to enable it to be slipped over the stem 152 of the main body portion 150 of the valve is provided. Its marginal end face at the open end thereof is beveled as at 166 in approximate accordance with the size, shape and contour of the seating surface desired in the final valve and outwardly thereof is preferably stepped as at 168. The member 164 is slipped over the stem 152 and located with its edge 166 in proper relation with respect to the head 156, upon which the member 164 is welded to the stem 152 as at 170 thereby positively and rigidly locating it with respect to the main body portion 150. A second cup-like member 172 whose open end is formed for complementary reception with respect to the stepped edge 168 of the member 164 is then applied to the member 164 in the manner illustrated in Fig. 28 and is welded thereto as at 174. The relation of the parts 164 and 172 is such that when assembled together the internal bottom surface of the member 172 will be arranged in spaced relation with respect to the head end surface of the main body portion 150 and closure 160 by an amount approximately equal to the thickness of the desired coating of special alloy thereon.

Prior to assembling the members 172 and 164 and welding them together a suitable mass of solid alloy of the character and composition desired to form the valve seating surface in the final product is placed within the member 164 and after the members 164 and 172 have been assembled and then welded together the whole assembly is placed in a furnace, preferably of the type shown in Figs. 5 or 6, is preferably slowly rotated to cause such alloy when melted to wash the exterior surfaces of the head end of the valve assembly, and is then subjected to a spinning operation to cause such molten alloy to be thrown axially of the valve towards the head end thereof. This spinning operation is accomplished in the manner illustrated in Fig. 29 in which the member 176 may be assumed to be a spindle or the like adapted to rotate about its axis passing centrally therethrough. The valve assembly is positioned in the member 176 with its axis arranged in a plane extending perpendicularly to the axis of rotation of the member 176 and with the head end of the valve assembly and the members 164 and 172 outwardly offset from the axis of the member 176. Assuming that the alloy positioned within the members 164 and 172 has been brought to a molten condition when the assembly is applied to the member 176, it will be apparent that when the member 176 and the valve assembly is rotated as in the direction of the arrow illustrated in Fig. 29, the molten alloy will be thrown centrifugally outwardly so as to enclose the head portion of the valve assembly, and when cooled will assume the relation illustrated at 178 in Fig. 28, thus forming a layer over that area of the assembly which is to form the valve seating surface, forming a layer extending over the head and face of the valve, and serving to bond the closure 160 to the head 156 over the outer face thereof. After the metal 178 has cooled then the members 164 and 172 may be machined away as well as such portion of the alloy 178 as is required to obtain a final product of the desired size, shape and contour, as illustrated in Fig. 30.

Figures 29, 30, 32, 33, 34, 35, 36:
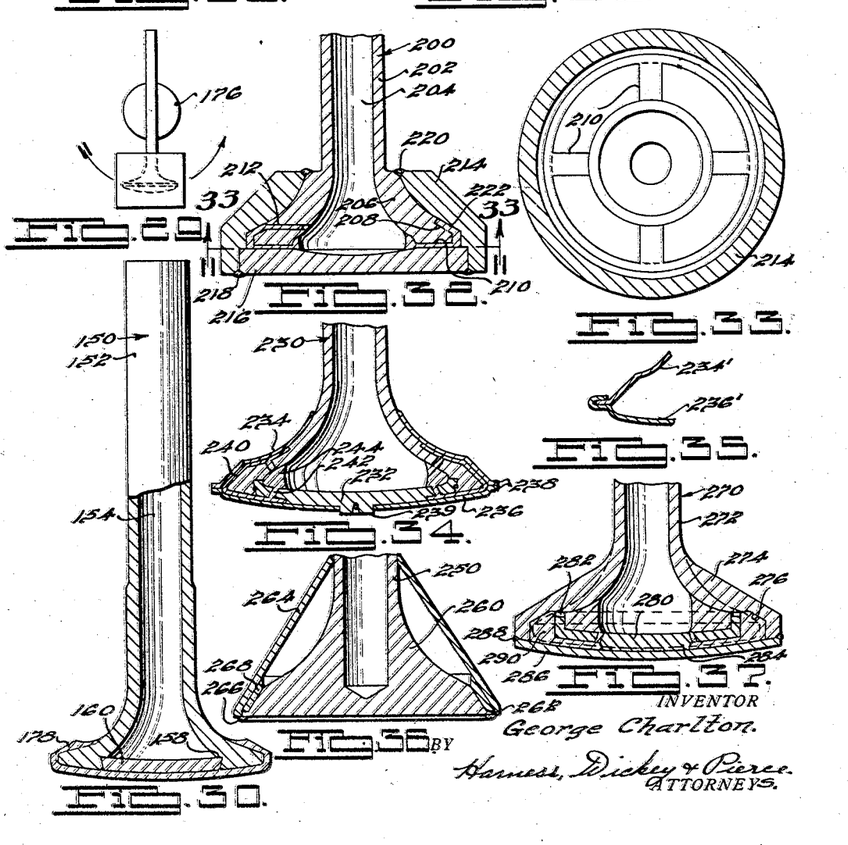
Fig. 29 is a more or less diagrammatic plan view of a modified form of spinning method for distributing alloy over the ultimate head portion of the valve to be formed from the blank shown in Fig. 28.
Fig. 30 is a fragmentary, partially sectioned view taken axially through a completed poppet valve formed in accordance with the disclosures in Figs. 28 and 29.
Fig. 32 is a view similar to Figs. 28 and 31 but showing a still further modified form of construction.
Fig. 33 is a transverse sectional view taken on the line 33—33 of Fig. 32.
Fig. 34 is a view similar to Fig. 28 but showing a further modified form of construction employing a sheet metal enclosure.
Fig. 35 is a fragmentary sectional view taken axially through a modified form of the closure illustrated in Fig. 34.
Fig. 36 is a view similar to Fig. 34 but illustrating a modified form of sheet metal enclosure for the valve blank.
Figure 31:
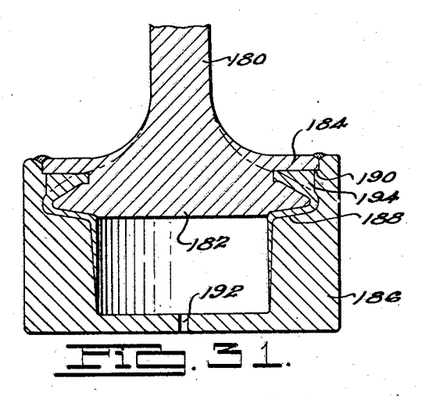
Fig. 31 is a view similar to Fig. 28 but showing a modified form of construction.

In Fig. 31 a method of providing a valve with a special alloy seating surface somewhat similar to the method illustrated in Figs. 28, 29 and 30 is shown except that in this case the special alloy is not extended over the full end surface of the valve nor is it employed to secure and seal any closure in place as in this case the valve is shown as of the solid type. In other words the valve as initially formed is provided with a solid stem portion 180 and integral head portion 182, the head portion 182 being provided with a radially outwardly directed annular flange portion 184 axially offset along the stem 180 from that area of the head 182 on which it is desired to form the valve seating surface. A cup-like member 186 is provided, the open inner end portion of which is formed to provide a surface 188 complementary to and arranged in spaced relation with respect to the axially outwardly marginal edge portion of the head 182. Near its open end the member 186 is interiorly formed to provide a shoulder 190 adapted to seat against the marginal edge portion of the flange 184 and above the shoulder to such a diameter as to receive the flange 184 therein to which it is welded. Engagement of the shoulder 190 with the flange 184 locates the surface 188 with respect to the complementary surface of the head 182. Before the member 186 is applied to the head 182 it is preferably filled with a suitable amount of solid alloy material which will eventually provide the valve seating surface of the valve. Preferably the bottom wall of the member 186 is provided with a vent 192. In heating the assembly shown in Fig. 31 to bring the alloy contained therein to a fluid state the assembly is preferably positioned in inverted relation to that illustrated in Fig. 31 and when the assembly is heated and the alloy therein brought to a molten condition it is placed in an apparatus substantially similar to that shown in Fig. 7 but modified so as to support the assembly with the head portion 182 thereof upwardly, and then rotated to cause the molten alloy to be distributed as at 194 therein. It will be understood, of course, that during the heating operation the assembly may be slowly rotated as explained in connection with the description of Figs. 5 and 6 to effect a washing of the walls of the assembly by the molten alloy if such step is found desirable. After the alloy has solidified, then the member 186, flange 184, and such other parts of the assembly may be machined away to form the completed valve which may correspond to the outline indicated in dotted lines in Fig. 31.

In Figs. 32 and 33 a method somewhat similar to that shown in Figs. 28 to 31, inclusive, is illustrated for providing a valve seating surface for a valve as well as to permanently secure two separately formed parts thereof together into a hollow valve structure. In this case the main body portion of the valve which is indicated generally at 200 is provided with a stem 202 provided with a bore 204 and a head portion 206 through which the bore 204 extends and in which it is flared outwardly to provide an enlarged hollow space in the head of the completed valve. Also in this case the walls of the head portion 206 are shown as of increased thickness as compared to the previously shown construction. The outer peripheral portion of the head 206 is cut away as at 208 over that portion thereof at which it is desired to form a valve seating surface of special alloy and the free end face of the head 208 is provided with one or more radially extending grooves 210 as best brought out in Fig. 33 the purpose of which is to provide a path of flow for the molten alloy from the hollow interior of the valve head to the portion 208 during the spinning operation. Additionally one or more holes 212 are preferably drilled in the head 206 between the radially inner end of the portion 208 and the hollow interior of the valve in order to permit the escape of any air that might be trapped in the portion 208 during the spinning operation as well as to equalize the distribution of the molten alloy. In this case a ring-like member 214 is slipped over the stem 202 and into contacting relationship with respect to the head 206, its interior surface being formed for more or less complementary engagement with the cooperating outer face of the head 206 and its inner wall extending into generally spaced relation with respect to the cut-away portion 208 so as to form a chamber between it and the portion 208 for reception of the special alloy to be delivered thereto, the surface of the member 214 over this area of the valve being approximately that desired in the final product as regards the size, shape and contour of the valve seating surface thereof.

In order to provide a closure for the open end of the valve and also for the open end of the member 214, a closure member 216 is inserted into the enlarged open end of the ring 214 and preferably into contacting relation with respect to the axial face of the head 206 and is preferably welded thereto as at 218. Likewise the ring 214 is preferably welded as at 220 to the head 206. As in the previously described constructions a suitable mass of solid alloy from which it is desired to form the valve seating surface is introduced into the hollow interior of the assembly indicated in Fig. 32 either before or after the parts thereof have been welded together as may best suit conditions, the whole assembly is heated to a sufficient extent to cause the special alloy to be melted, and then the assembly is spun in an apparatus such as that indicated in Fig. 7 to cause the molten alloy to be thrown outwardly under centrifugal force to the position indicated at 222 where such alloy becomes solidified. Thereafter the assembly may be subjected to a machining operation to remove the ring 214 and as much additional metal from the remaining parts of the assembly shown in Fig. 32 as is desirable or necessary to bring it to its completed final condition. Consequently in this construction the alloy 222 not only serves to provide the desired valve seating surface in the final product but also to secure the closure member 216 to the main body portion 200 and thereby effect an integral structure in the completed product.

In Fig. 34 the main body portion 230 of the valve is hollow and its open end is closed by a member 232 of a nature similar to the closure 160 described in connection with Fig. 28. An enclosure for the head portion of the assembly is provided by means of a pair of stamped metal parts 234 and 236 provided with mating peripheral flanges 238 which are preferably suitably welded together. The part 236 is located centrally with respect to the closure 232 by means of a pilot portion 239 which fits a complementary opening in the member 236. The radially outer portions of the members 234 and 236 are arranged in spaced relation with respect to the complementary outer surface portions of the head portion of the assembly to form an annular chamber 240 for reception of the special alloy which is to form the valve seating surface and secure and seal the closure 232 in place. Holes 242 are drilled through the outer edge portions of the closure 232 and head portion of the valve so that when the special alloy introduced in solid form into the valve assembly is heated and the assembly is spun, as in a fixture similar to that shown in Fig. 7, the molten alloy will be thrown centrifugally outwardly to assume the relation shown at 244 in which it fills the annular chamber 240 and permanently seals the closure 232 to the main body portion 230.

If desired, instead of providing the members 234 and 236 with radial flanges welded together as illustrated in Fig. 4, the radially outer portions of these parts may be formed as indicated in Fig. 35 in which the parts 234' correspond to the parts 234 in Fig. 34 and the part 236' corresponds to the part 236 in Fig. 34. In this case the outer marginal edge of the portion 236' is crimped over the radially outer edge of the part 234' to effect the desired result.

In the construction shown in Fig. 36 the valve is hollow although all portions of the head thereof are initially formed integrally. In other words the construction includes a valve including a stem portion 250 and a head portion 260. At the extreme axial end of the head portion 260 a short radial flange or shoulder 262 is provided. A hollow frusto-conical sheet metal member 264 is slipped over the stem 250 with its open end fitting the outer surface of the flange 262 to which it is welded as an 266. The small end of the cone-like member 264 is preferably slightly spaced from the stem 250 as indicated for venting purposes. A suitable amount of special alloy of desired composition is introduced into the space between the member 264 and the head 260 of the valve so that when the assembly is heated sufficiently to melt the alloy and is spun in an apparatus such as that illustrated in Fig. 7 molten alloy will be thrown outwardly and assume the position indicated at 268 where it will form the valve seating surface after the member 264 has been machined away. With this construction it is not essential that the assembly be subjected to a centrifugal action as the molten alloy will flow by gravity to the desired position, but such spinning will usually be found preferable in order to effect a better bond between the alloy and the head of the valve and also to densify the alloy itself.

In the construction illustrated in Fig. 37 it is desired to have the special alloy not only serve as the valve seating surface but to also overlie the outer edge surface of the head of the valve to protect it against the corrosive and errosive effects of hot exhaust gases. The construction shown in this figure is also of the hollow type and includes a main body portion indicated generally at 270 having a hollow stem 272 and a hollow head 274. In this case the head 274 is made of a diameter exceeding that desired in the final product and which head is interiorly machined out so as to provide an inner surface 276 approximately corresponding in size, shape and contour to that desired for the final valve seating surface. Within the hollow interior of the head is positioned a more or less cup-like member 280 whose open edge is placed in contacting relation with respect to an axially directed surface of the hollow interior of the head 274. The open edge of the cup member 280 is preferably provided with one or more radially directed slots 282 therein to provide for the flow of molten alloy therethrough. The bottom wall of the member 280 is preferably centrally provided with a downwardly extending projecting portion 284 against which the closure member 286 is adapted to contact thereby to space it from the outer axial wall portions of the member 280, and its outer margin is welded to the outer margin of the head 274 as at 288. The hollow interior of the head 274 is, of course, filled with a suitable mass of solid alloy material of the desired composition and when the entire assembly is heated to a sufficiently high temperature to effect melting of the alloy and the entire assembly is spun as in a fixture such as illustrated in Fig. 7 the melted alloy is thrown outwardly to assume the position indicated at 290 and in which it is not only in a position to serve as the valve seating surface of the final product but also serves to secure the member 280 to the head 274 and to securely seal the connection between them. After the special alloy has solidified then the entire assembly is machined to bring it to the shape indicated by dotted lines and in which the closure member 286 is entirely removed as well as those portions of the head 274 outwardly of the surface 276.

Figure 38:
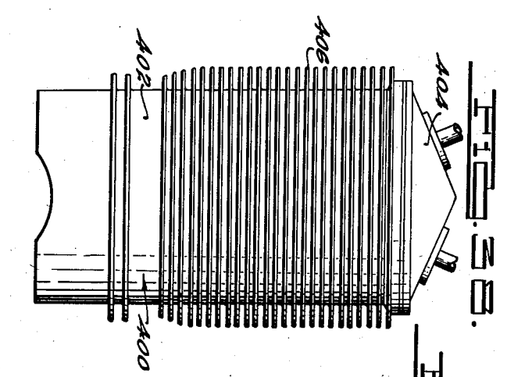
Fig. 38 is a side elevational view of an air cooled cylinder for an internal combustion engine.
Figures 39, 40:
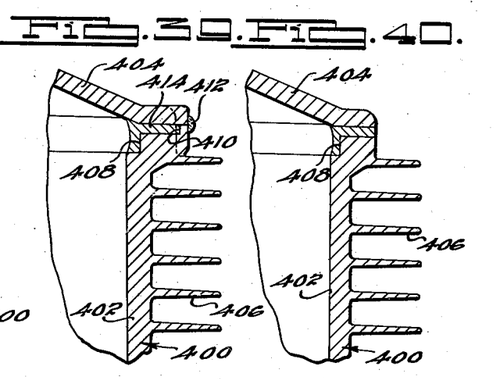
Fig. 39 is an enlarged fragmentary, vertical sectional view taken in a plane radial of the cylinder shown in Fig. 38 and illustrating the application of the present invention thereto in the securement of the cylinder head to the cylinder body, the parts being shown in the condition resulting immediately after the welding operation.
Fig. 40 is a view similar to Fig. 39 but showing the parts in finished condition.

In Figs. 38 to 43, inclusive, the application of the broad principles of the present invention to uses other than in connection with poppet valves is shown by way of illustration. Referring now to Figs. 38, 39 and 40, the application of the present invention to the securement of the head to the main body portion of an air cooled cylinder for an internal combustion engine is shown. The cylinder is indicated generally as at 400 and as including a hollow cylindrical main body portion 402 and a head 404 closing one end thereof. The main body portion 402 is externally provided with a plurality of cooling fins 406 preferably formed integrally therewith. It is conventional practice to form the heads of such cylinders integrally with the main body portion thereof but this is obviously extremely expensive in the manufacture of such cylinders. According to the present invention the main body portion 402 is formed independently of the head 404 and thereafter applied and secured thereto in accordance with the present invention. In this case a preferable method of carrying out the present invention is to form the upper end wall of the main body portion 402 with two steps 408 and 410, respectively. The head 404 is then placed over such end and welded thereto as at 412 thus creating an L-shaped annular groove 414 between the main body portion 402 and head 404. The assembly is inverted, a suitable amount of solid alloy, which may be of one of the types previously described, is then placed in the head, the whole assembly is brought up to a temperature sufficient to melt the alloy but without causing a melting of the main body portion 402 or head 404, the assembly may be tipped slightly on its axis and rotated slowly in accordance with the practice described in connection with Fig. 5 to effect a washing action of the molten alloy against the inner surfaces of the groove 414, and then the whole assembly may be spun with its axis in a vertical relation to centrifugally force such molten alloy out into the groove 414, and this spinning action continued until the alloy has solidified, the whole being in accordance with the same general practices previously described in connection with the poppet valves. The assembly may then be machined to bring it to its final condition illustrated in Fig. 40. It will be apparent that by employing this method of forming an engine cylinder it permits the independent machining of the main body portion and the head portion of the same, thus effecting a material saving in manufacture, and the resulting final product will be to all intents and purposes equally if not more satisfactory than an equivalent construction formed out of a single piece of metal.

Figure 41:
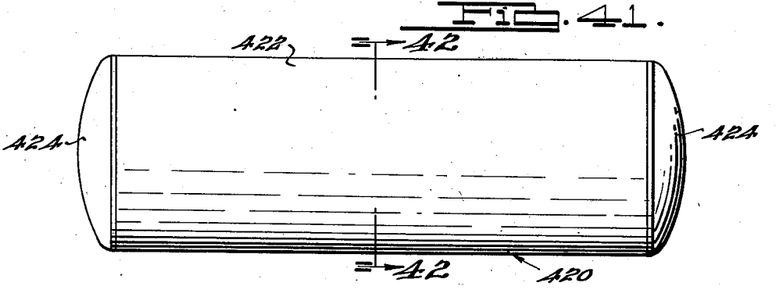
Fig. 41 is a side elevational view of a tank adapted to contain liquids or gases under high pressure or like uses.
Figure 42:
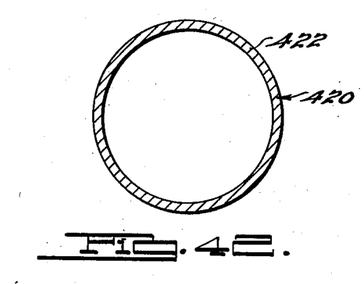
Fig. 42 is a transverse sectional view taken on the line 42—42 of Fig. 41.
Figure 43:
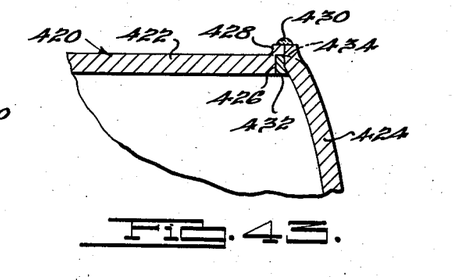
Fig. 43 is an enlarged fragmentary, sectional view taken in a plane radially of the axis of the tank shown in Fig. 41 and illustrating the application of the present invention to the securement of the heads of the tank to the main body thereof.

In Figs. 41, 42 and 43 the application of the present invention to a high pressure tank indicated generally at 420 is illustrated. In this case the tank comprises a hollow cylindrical main body portion 422 and opposite end portions 424 which are preferably of the rounded or bulged type. In this case the end surfaces of the main body portion 422 are stepped as at 426 and preferably a small peripheral flange 428 is provided at this point so that the stepped portion 426 may extend out into flush relation with respect to the exterior surfaces of the main body portion 422. In operation one head 424 is first applied as indicated in Fig. 43 and is welded to the peripheral face of the flange 428 as at 430. The assembly is placed with the attached head 424 downwardly, a suitable amount of solid alloy which may be of a type previously described is placed within the tank, the tank is heated sufficiently to melt the alloy without melting the tank, the assembly may be slightly tilted and rotated to effect a washing of the alloy against the opposed faces of the main body portion 422 and head 424, and then the entire assembly spun about a vertical axis to cause the alloy to be contrifugally distributed into the stepped portion 426 and between it and the head 424 as at 432, the spinning being maintained until the alloy has solidified. After the assembly has cooled an additional amount of the solid alloy material is placed within the tank, the opposite end 424 is applied and welded in place, the assembly is positioned with this last head downwardly and the above described operations are then repeated, thus firmly securing and sealing the last mentioned head in place. The flanges 428 and corresponding margins of the heads 424 may then be machined away as indicated by the dotted line 434 to bring the tank to its completed condition.

Formal changes may be made in the specific embodiments of the invention described without departing from the spirit or substance of the broad invention, the scope of which is commensurate with the appended claims.

What I claim is:

1. A unitary blank for a poppet valve comprising a main body portion having a hollow head and a stem, said head having an annular groove formed in an outer surface thereof, means welded to said head arranged in sealed relation with respect to the marginal edges of said groove whereby to form it into a closed chamber, and said head having means therein forming passageways extending between said chamber and the interior of said head.

2. A blank for a poppet valve comprising a main body portion having a hollow head and a stem, said head having an annular groove formed in an outer surface thereof, means welded to said head arranged in sealed relation with respect to the marginal edges of said groove whereby to form it into a closed chamber, and said head having means therein forming passageways extending between said chamber and the interior of said head, and a mass of solid material having a melting point in excess of 1000° F. but less than the melting point of said main body portion confined within said head.

3. The method of making a poppet valve including the steps of forming a part of approximately the size, shape and contour of the desired finished valve, removing metal from that portion of said part at which it is desired to locate the seating surface of the valve, providing a shroud about said portion of said parts to form an annular channel including said area, filling said annular chamber with molten metal of a character different from the metal of said parts, and after solidification of said material removing said shroud to expose said material on the exterior of said part over that portion thereof adapted to provide the valve seating surface.

4. The method of making a hollow valve including the steps of forming a hollow main body portion including an open ended hollow head portion, securing a closure member to said main body portion, providing a mass of material having a lower melting point than said main body portion and said closure member within said hollow head, heating both said portions and said material to a temperature above the melting point of said material and below the melting point of said main body portion and said closure member, spinning said heated assembly to cause said molten material to be deposited around the peripheral portions of the hollow interior of said head, the amount of said material provided being insufficient in volume to extend laterally beyond the space between said head and closure member when melted and spun, maintaining said spinning until said molten material has been solidified, and then machining said assembly to expose said material as a seating surface of said valve on the exterior thereof without exposing the hollow interior of said valve in said machining operation.

5. The method of making a hollow valve including the steps of forming a hollow main body portion including an open ended hollow head portion, securing a closure member to said main body portion, providing a predetermined mass of material having a lower melting point than said main body portion and said closure member within said hollow head, heating both said portions and said material to a temperature above the melting point of said material and below the melting point of said main body portion and said closure member, spinning said heated assembly to cause said molten material to be deposited around the peripheral portions of the hollow interior of said head only, maintaining said spinning until said molten material has solidified, and then machining away portions of said main body portion and said closure to form the completed valve and to expose said material on that exterior surface thereof including the seating surface of said valve without exposing the hollow interior of said valve in said machining operation.

6. The method of making a poppet valve including the steps of forming a plurality of parts into a hollow structure having a hollow stem and an enlarged hollow head open thereto, introducing into the interior of said hollow structure a mass of material having a melting point below the melting point of said parts but of a sufficiently high value to cause it to become intimately bonded to said parts when said parts of said material are heated to a temperature sufficient to cause said material to be melted, heating said parts and material to a temperature below the melting point of said parts but above the melting point of said material, subjecting said assembly to a spinning operation and thereby effecting a centrifugal distribution of said molten material between said parts in the hollow head portion only thereof and the bonding thereof to said parts, maintaining said spinning operation until said molten material has solidified, and then subjecting the resulting assembly to a machining operation to expose said material on the exterior of said assembly and to bring said assembly to the size, shape and contour desired in the finished valve without exposing the hollow interior of said valve in said machining operation.

7. In the manufacture of a hollow poppet valve, the steps of providing a main body portion having a hollow head and a hollow stem, internally machining said head portion to provide an interior surface simulating the size, shape and contour of the valve seating surface in the final product, securing a closure to the open face of said head, providing a mass of material having an elevated melting point less than the melting point of said main body portion within said head, heating said assembly to a temperature sufficient to melt said material but insufficient to melt said main body portion and said closure, effecting a relatively slow rotation of said assembly about an axis inclined to the vertical while said material is in molten condition whereby to cause said material to wash the interior walls of said assembly, and then subjecting said assembly to a spinning operation about the axis thereof whereby to centrifugally distribute said molten material in the peripheral portions of said hollow head, and maintaining said spinning operation until said material has solidified.

8. In the manufacture of a poppet valve, the step of forming a hollow body having a head portion the interior walls of which extend radially outwardly beyond the remaining portion of the interior walls of said body, introducing into the hollow body a material desired for a valve seating surface having a melting point lower than the melting point of the material from which said body is formed and of a volume insufficient when in melted form to completely fill said radially outwardly projecting portion of the hollow interior of said head portion, heating said body and contained material to a temperature sufficient to melt said material but insufficient to melt the material of said body, spinning said heated body and contained molten material to effect a centrifugal distribution of said material in said radially outwardly projecting portion only of the interior of said head portion, continuing said rotation of said body and material while permitting the dissipation of heat therefrom until said material has solidified, and then machining the resulting assembly to expose said material on the exterior thereof as a seating surface for said valve without exposing the hollow interior of said valve in said machining operation.

9. In the manufacture of a poppet valve, the steps of preforming a plurality of independent parts, assembling said parts together to form a hollow structure, introducing into the interior of said structure a mass of material having a melting point below the melting point of said parts but of a sufficiently high value to cause it to become intimately bonded to said parts when said parts and said material are simultaneously heated to a temperature sufficient to cause said material to be melted, heating said parts and material to a temperature below the melting point of said parts but above the melting point of said material, subjecting said heated assembly to a spinning operation whereby to effect a centrifugal distribution of said molten material between said parts and the bonding thereof to said parts, maintaining said spinning operation until said molten material has solidified, and then machining said assembly to expose said material on the desired seating surface of said valve without exposing the hollow interior of said valve in said machining operation.

10. In the manufacture of a poppet valve, the steps of forming a blank of a size larger than that desired in the product to be formed therefrom with a circular recess enclosed therein including that portion of the desired finished valve forming the seating surface thereof, casting a molten metal of a character desired for the valve seating surface into said recess only and allowing it to solidify, and then machining away the outer surface of said blank to expose said material on the exterior surface thereof and to form said material into the seating surface of said valve without exposing the hollow interior of said valve in said machining operation.

GEORGE CHARLTON.